United States Patent [19]

Mernone

[11] 3,921,067
[45] Nov. 18, 1975

[54] STRAY ENERGY DETECTION CIRCUIT
[75] Inventor: Arthur N. Mernone, Indianapolis, Ind.
[73] Assignee: The United States of America as represented by the Secretary of the Navy, Washington, D.C.
[22] Filed: June 24, 1974
[21] Appl. No.: 482,391

[52] U.S. Cl. ............... 324/72; 324/78 F; 324/78 J; 324/128; 307/233; 328/140
[51] Int. Cl.² .......................................... G01R 31/02
[58] Field of Search ..... 324/57 Q, 78 J, 78 F, 77 A, 324/77 E, 128, 154 R; 307/233; 328/140, 142

[56] References Cited
UNITED STATES PATENTS
3,778,709 12/1973 Williams ............................. 324/72

Primary Examiner—R. V. Rolinec
Assistant Examiner—Michael J. Tokar
Attorney, Agent, or Firm—R. S. Sciascia; Paul S. Collignon

[57] ABSTRACT

An energy detection circuit for determining an unacceptable limit of stray energy in an armament firing circuit. A resistive load is connectable with an armament firing circuit and any firing circuit voltage developed across the resistive load serves as an input to a first amplifier. A diode bridge circuit in association with the first amplifier provides low level AC detection and a complex R-C feedback impedance is provided to give the detecting circuit an output proportional to the energy content of an input pulse. The rectified voltage output from the first amplifier is compared with a reference voltage to determine whether the stray energy in the armament firing circuit is at an acceptable level.

5 Claims, 4 Drawing Figures

STRAY ENERGY DETECTION CIRCUIT

BACKGROUND OF THE INVENTION

The present invention relates to a stray energy detection device that determines whether a safe condition exists for connecting weapons, such as bombs or rockets to an electrical arming system. Many weapons are detonated by a small explosive device, such as a squib, which itself is detonated by an electrical current. In order to provide maximum safety, a weapon is usually not connected with an armament firing device until a mission is to begin. For an aircraft, this means that the weapon is electrically connected to an arming device, operable by a pilot or bombadier, immediately prior to aircraft takeoff. The aircraft and the armament circuit, in the meantime are usually subjected to various forms of radiation, the main source of which is high-powered radar devices.

Heretofore, detection of unsafe electrical energy levels have been limited to steady state voltage detection systems. These systems have the disadvantage of being insensitive to millivolt level signals and also are highly temperature sensitive. Also all heretofore available detectors were unresponsive to pulse energy for periods of less than 1 millisecond.

SUMMARY OF THE INVENTION

The present invention relates to a detector circuit which can detect unsafe levels of electrical energy in the form of alternating current, direct current, or pulses.

A resistive load is connectable with an armament firing circuit, such as one found on a military aircraft, and any firing circuit voltage developed across the resistive load serves as an input to an amplifier. A diode bridge circuit in association with the amplifier provides low level AC detection and a resistor-capacitor feedback network provides an output proportional to the energy content of an input pulse. The rectified voltage output from the amplifier is compared with a reference voltage to determine whether the stray energy in the armament firing circuit is at an acceptable level.

It is therefore a general object of the present invention to provide a detector system which will detect all forms of electrical energy and provide an indication as to whether a safe condition exists.

Other objects, advantages and novel features of the invention will become apparent from the following detailed description of the invention when considered in conjunction with the accompanying drawings.

DESCRIPTION OF THE PREFERRED EMBODIMENT

Figure 1:
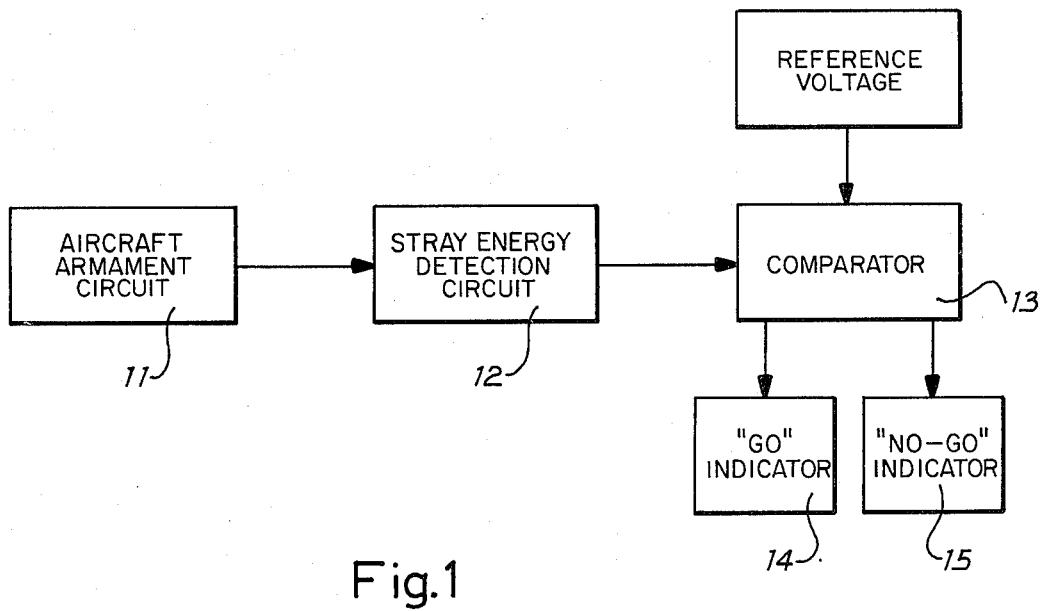
FIG. 1 is a block diagram of a preferred embodiment of the invention.

Referring first to FIG. 1 of the drawings, there is shown an embodiment of the invention being used to test the aircraft armament cable 11 in a military aircraft. The stray energy detection circuit 12 is mated with the aircraft armament cable 11 by using suitable adapter connectors and any stray energy detected is compared with a reference voltage in comparator 13. By way of example, a green GO light 14 might be energized when the reference voltage is greater than the detected voltage, and a red NO-GO light 15 might be energized when the detected voltage is greater than the reference voltage. By further way of example, in an embodiment used with a military aircraft, any DC voltages in excess of 75 millivolts, sine wave AC voltages greater than 83 millivolts (100 Hz to 100 KHz) and pulses having the same or greater heating effect on an electroexplosive device, will cause the NO-GO light to be energized, thus indicating that an unsafe condition exists.

Figure 2:
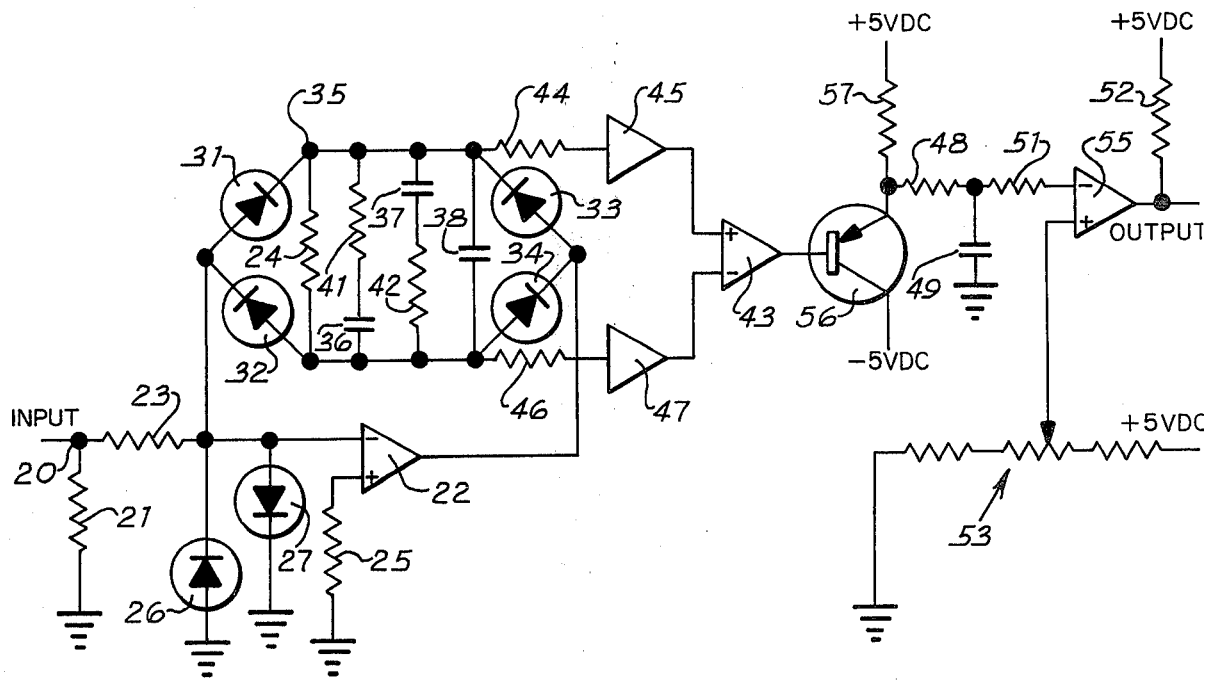
FIG. 2 is a schematic diagram of the preferred embodiment.

Referring now to FIG. 2 of the drawings, the input terminal 20 of detection circuit 12 is connected to a non-energized firing circuit, and any firing circuit voltage is developed across resistor 21. One input terminal of an operational amplifier 22 is connected to input terminal 20 through resistor 23, and the voltage gain of amplifier 22 is established by resistors 23 and 24. The output voltage of amplifier 22 is made a function of a feedback network. The positive input terminal of amplifier 22 is connected to ground through resistor 25 which reduces output errors caused by the amplifier's bias currents and diodes 26 and 27 are provided to protect amplifier 22 from any excess voltage applied to input terminal 20.

Diodes 31, 32, 33, and 34 are connected in a bridge circuit and rectify amplifier 22's feedback current. These diodes are connected so that the polarity of resistor 24 is always positive at junction 35, which is common to diodes 31 and 33. Capacitors 36, 37, and 38 are shunted in parallel across the diode bridge circuit and, for AC input voltages, capacitors 36, 37, and 38 are subjected only to a rectified voltage, so that rather than changing the overall gain of amplifier 22 with frequency, the gain remains constant from 100 Hz to over 100 KHz. Capacitors 36, 37, and 38 filter the rectified voltage across resistor 24 causing amplifier 22's output voltage to respond to an average value of steady state inputs. Under normal operating conditions, the voltage across resistor 24 is constant in polarity for AC inputs, however, this voltage appears as a small differential signal superimposed upon the larger AC signal caused by the alternate conduction of the diode bridge. In order to minimize this diode induced common mode voltage and, in order to provide efficient rectification at high frequencies, diodes 31, 32, 33, and 34 are of the Schottky barrier type.

Figure 3:
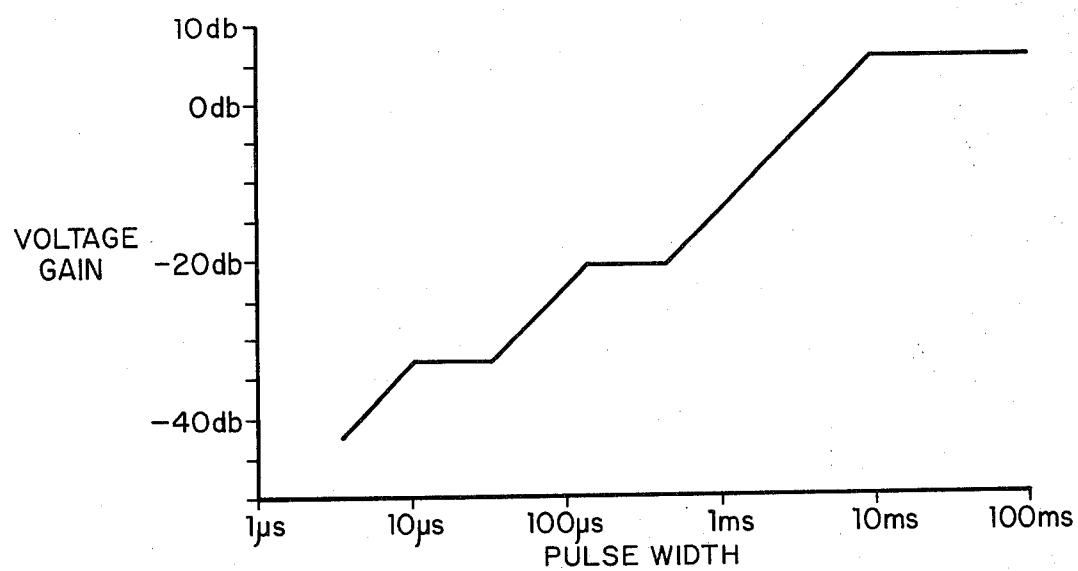
FIG. 3 is a graph showing gain in relation to pulse width for an amplifier used in the present invention.

Resistors 24, 41, and 42, along with capacitors 36, 37, and 38, have been selected to give the detecting circuit an output proportional to the energy content of an input pulse having a width in the range of 10 μsec to 1 millisecond. Narrow input pulses contain a relatively large percentage of high frequency components which cause capacitors 36, 37, and 38 to display low impedance characteristics. These capacitors, therefore, bypass feedback current from resistor 24 to reduce the differential output voltage of amplifier 22 and, to effectively lower the closed loop gain. This lower gain, in turn, requires a higher input voltage for the desired output. Conversely, wide input pulses have more low frequency components which cause capacitors 36, 37, and 38, to display higher impedances and allow amplifier 22 to approach its DC gain. The wider pulses, therefore, require lower input voltages than the narrow pulses, but higher than for DC or steady state AC. In FIG. 3 of the drawings, there is shown a piecewise approximation of the gain of amplifier 22, as a function of pulse width.

Figure 4:
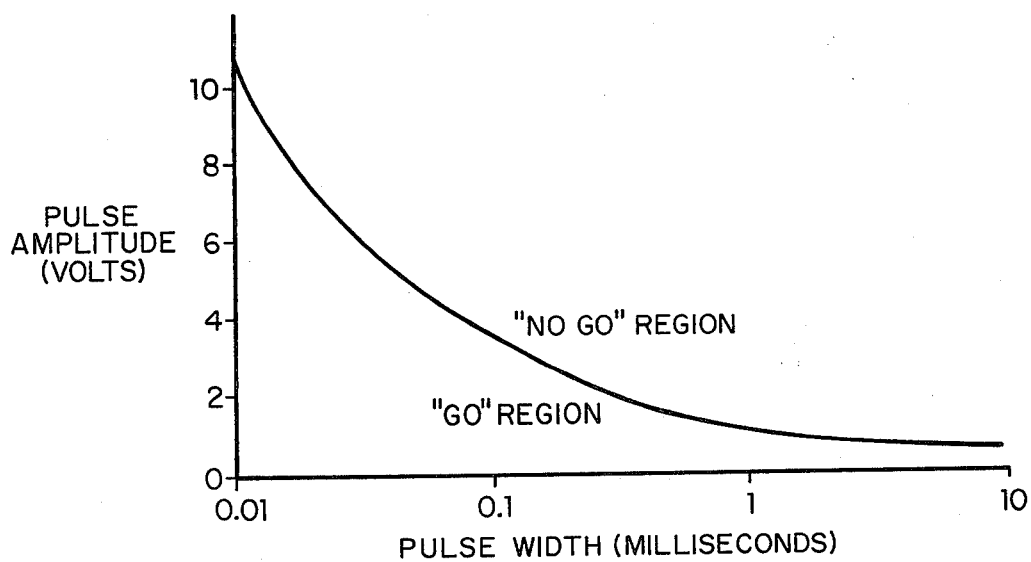
FIG. 4 is a graph showing "GO" — "NO-GO" conditions for the present invention.

FIG. 4 of the drawings shows the characteristics of pulses that are acceptable (GO) and not acceptable (NO-GO). Any single combination of pulse width versus amplitude that falls in the NO-GO region will be processed to illuminate red NO-GO indicator 15.

Referring again to FIG. 2 of the drawings, the rectified output from the diode bridge is applied to amplifier 43 through resistors 44 and 46 and buffers 45 and 47. Resistors 44 and 46 are provided to protect the inputs of buffers 45 and 47, respectively, from possible damage due to discharge of capacitors 36, 37, and 38 during circuit de-energization. Amplifiers 45 and 47, which are extremely low input current unity gain buffers, are used to prevent the relatively low input impedance of amplifier 43 from disturbing the feedback network of amplifier 22.

Amplifier 43 is a differential amplifier which has high common mode rejection from DC to frequencies above 100 KHz, and the major function of amplifier 43 is to remove the large common mode signal caused by the switching of diodes 31, 32, 33, and 34, from the smaller differential signal generated by amplifier 22 and its resistor and capacitor feedback components. Amplifier 43 also provides a gain of approximately eight, which is constant with changes in frequency and temperature.

The output from amplifier 43 is applied to comparator 55 through transistor 56. Transistor 56 with resistor 57 is an emitter-follower stage which is used to temperature compensate the output voltage level of amplifier 43. Resistor 48 and capacitor 49 form a low pass noise filter to attenuate unwanted signals above the 100 KHz maximum frequency of interest. Resistor 51 is provided to protect the input of comparator 55. Comparator 55 and load resistor 52 provide the desired GO — NO-GO output signal by comparing the output from transistor 56 with a reference voltage established by voltage divider 53.

OPERATION

In operation, the stray energy detection circuit 12 is connected to an armament firing circuit, which is non-energized. Any AC or DC voltages, or any pulses present in the non-energized armament firing circuit are applied to resistor 21 where they are developed as an input to wide bandwidth amplifier 22. Any AC voltage present is rectified by hot carrier diodes 31, 32, 33, and 34 and then applied to the unity gain buffers 45 and 47. These buffers supply the differential inputs to amplifier 43, which applies a single ended output voltage to comparator 55, where comparison of the processed firing circuit voltage to a reference voltage is accomplished. The output from comparator 55 is applied to GO indicator 14 when the reference voltage is greater than the processed firing circuit voltage, and the output from comparator 55 is applied to NO-GO indicator 15 when the processed firing circuit voltage is greater than the reference voltage. The R-C feedback network associated with amplifier 22 has no effect on steady state AC, or DC voltages, but acts to condition and contour pulses prior to application to the remainder of the circuit.

Obviously many modifications and variations of the present invention are possible in the light of the above teachings. It is therefore to be understood that within the scope of the appended claims the invention may be practiced otherwise than as specifically described.

I claim:

1. An energy detection circuit for determining an unacceptable limit of stray energy in an armament firing circuit comprising,
   a resistive load connectable with an armament firing circuit,
   a first amplifier having an output and an input connected to said resistive load,
   a feedback circuit including a rectifying circuit connected between said output and said input of said first amplifier, said rectifying circuit being comprised of first, second, third, and fourth barrier type diodes connected in a bridge circuit having first and second terminals connected with said first amplifier and having third and fourth output terminals,
   means in said feedback circuit for providing gain to said first amplifier proportional to the stray AC energy in said armament firing circuit,
   a second amplifier having inputs connected to said rectifying circuit and having a single ended output,
   a source of reference voltage, and
   a comparator circuit connected to said output of said second amplifier and to said reference voltage source and providing an indicating output when said voltage output of said second amplifier is greater than said reference voltage.

2. An energy detection circuit as set forth in claim 1 wherein said output of said second amplifier is connected to said comparator through an emitter-follower transistor for temperature compensating the output of said second amplifier.

3. An energy detection circuit as set forth in claim 1 wherein said comparator is a differential amplifier.

4. An energy detection circuit as set forth in claim 1 wherein said means in said feedback circuit for providing gain to said first amplifier comprises a resistor-capacitor network shunted across said third and fourth output terminals.

5. An energy detection circuit as set forth in claim 4 wherein said second amplifier is connected to said third output terminal through a first buffer amplifier and to said fourth output terminal through a second buffer amplifier.

* * * * *